United States Patent [19]

Koch et al.

[11] Patent Number: 4,576,924

[45] Date of Patent: Mar. 18, 1986

[54] PROCESS FOR THE DESORPTION OF SPENT SOLID ABSORBENT

[75] Inventors: Manfred Koch, Holzwickede; Ludwig Mühlhaus, Iserlohn; Rolf Lambach, Hagen; Horst Grochowski, Oberhausen, all of Fed. Rep. of Germany

[73] Assignee: UHDE GmbH, Dortmund, Fed. Rep. of Germany

[21] Appl. No.: 306,962

[22] Filed: Sep. 30, 1981

[30] Foreign Application Priority Data

Oct. 2, 1980 [DE] Fed. Rep. of Germany ....... 3037187

[51] Int. Cl.$^4$ .................... B01J 20/34; B65G 27/00; B01F 11/00; C01B 31/08
[52] U.S. Cl. ........................................ 502/56; 34/164; 55/73; 55/390; 198/770; 198/771; 366/114; 366/128; 432/134; 502/5; 502/21
[58] Field of Search .............. 252/411 R, 411 S; 34/164; 432/134; 201/12, 20, 32, 33; 502/5, 21, 34, 56; 198/770, 771; 366/114, 128; 55/208, 390

[56] References Cited

U.S. PATENT DOCUMENTS

| 3,789,796 | 2/1974 | Madrid | 34/164 |
| 3,868,213 | 2/1975 | Shulika et al. | 34/164 |

FOREIGN PATENT DOCUMENTS

| 52-5697 | 1/1977 | Japan | 252/411 R |
| 52-7395 | 1/1977 | Japan | 252/411 R |
| 54-6892 | 1/1979 | Japan | 252/411 R |
| 783326 | 9/1957 | United Kingdom | 34/164 |

Primary Examiner—P. E. Konopka
Attorney, Agent, or Firm—Marshall & Melhorn

[57] ABSTRACT

This invention relates to a process for the desorption of spent solid adsorbent through heating the latter to desorption temperature by means of a hot granular heat carrier medium; particularly of activated coal or activated coke used for flue gas purification by adsorption in power plants, for example.

1 Claim, 2 Drawing Figures

U.S. Patent   Mar. 18, 1986   4,576,924 form a relative mixing motion in addition to the revolving motion because of friction and particle surface serration as well as different particle inertia. These phenomena combine to cause an ascension of the activated coke 13 across the specifically heavier sand 12 on the inclined surface of the mixture stream in the material

PROCESS FOR THE DESORPTION OF SPENT SOLID ABSORBENT

BACKGROUND OF THE INVENTION

It is known to perform regeneration of activated coal or activated coke by the thermal process in which, for example, activated coke is contacted with a heat carrier medium which is at a temperature of more than 500° C. as described in DE-PS No. 1 719 554. The spent activated coke and the hot sand are fed separately to a desorber. The desorber is equipped with means to ensure good mixing of the two material streams. This method makes use of the phenomenon that gas is liberated during desorption, said gas contributing to the formation of an autogenous fluidized bed in the mixing zone. The means to ensure good mixing are stationary, not mobile. Consequently, optimum mixing and utilization of the heat carrier medium can be achieved under design conditions only.

At part-load—referred to the hourly throughput of activated coke—an irregular distribution of activated coke and hot sand might be encountered. Therefore, the flow rate of recycle sand will generally achieve the process requirements under part-load conditions.

Further known measures, such as the installation of weirs beneath the concentric feed pipes according to OS No. 25 39 266 do not reduce the segregating effect to any appreciable extent and are not fully effective under part-load conditions or require an increased sand flow rate. During their downward flow, the activated coke particles are more and more heated by the surrounding sand, but are at the same time increasingly encapsulated by the sand because the bulk density above the particles rises with increasing depth. Louver-type circumferential guide vanes provide additional gas space, but require enlargement of the desorber.

SUMMARY OF THE INVENTION

The object of the invention is to provide an improvement of the process according to the preamble of the application so that it can be performed in a simpler way and more efficiently while reducing equipment requirement.

The problem is solved by a process generally including the steps of mixing a cold spent solid absorbent medium with a heat carrier medium, immediately tumbling the mixture in a revolving path as it moves along an inclined carrier and subjecting the revolving mixture to periodical linear vibrating forces.

Typically, the process may be achieved by apparatus including an elongate, inclined tubular carrier having a lower semicircular cross-sectional portion which is resiliently supported, together with a mechanism for imparting vibratory forces to the inclined carrier.

The invention utilizes the favourable effects of a revolving flow, preferably in a vertical to slightly inclined plane, for creating an advantageous and effective transfer and desorption.

The excellent mixing provides a rapid and uniform transfer of heat from, for example sand to an activated coke; therefore, desorption is initiated rapidly and completed with a short time. Consequently, the entire desorption process—mixing, preliminary degassing, principal degassing, final degassing—can take place within the material stream because the residence time for final degassing is markedly reduced.

In addition, it was found that the quantity of sand can be reduced in relation to the quantity of activated coke, which means further saving of energy and equipnment volume.

BRIEF DESCRIPTION OF THE DRAWING

The characteristics of the invention and their added technical benefits will be noted from the following description to be read in conjunction with the accompanying drawings in which.

DETAILED DESCRIPTION OF THE PREFERRED EMBODIMENT

Figure 1:
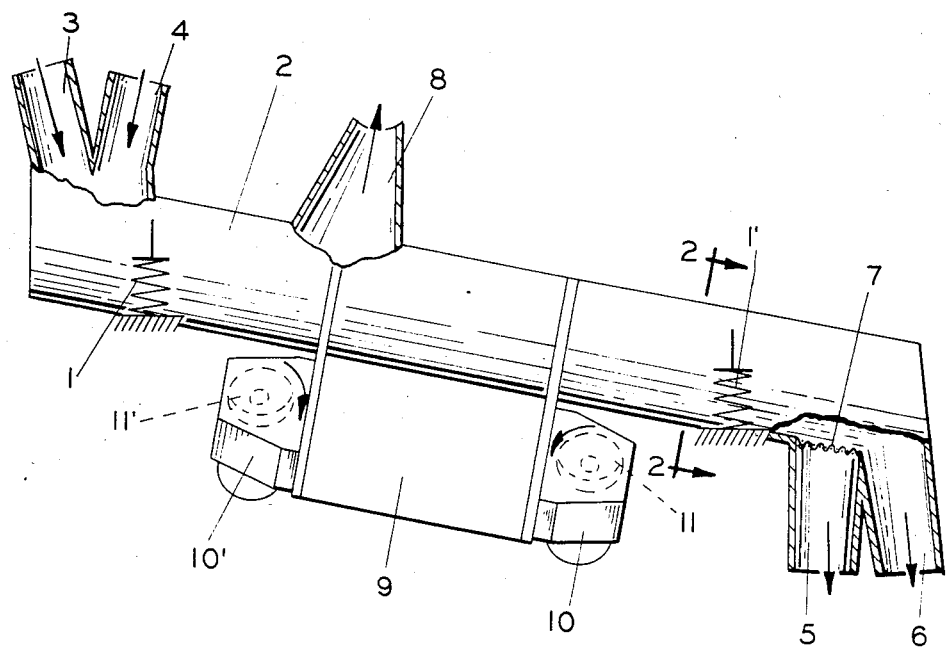
FIG. 1 is a side elevational view of a device for implementing the process.
Figure 2:
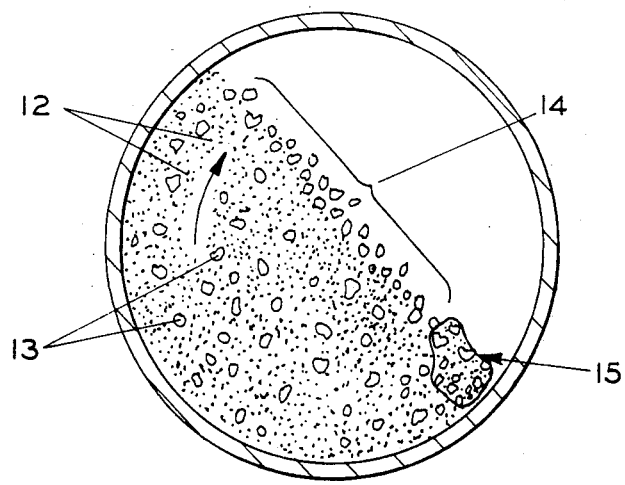
FIG. 2 is a cross-sectional view taken substantially along line 2—2 of FIG. 1 of a preferred flow configuration of the sand/activated coke mixture.

According to FIG. 1 and 2 the spent activated coke and the hot sand are joined and are forced into the flow configuration as shown in FIG. 1 immediately at the point of mixing.

Referring to a material carrier 2, preferably of the tubular type, resting resiliently of four spring elements 1 and 1' the sand inlet is marked 3, the activated-coke inlet is marked 4. The carrier 2 is inclined with respect to a horizontal plane and its inclination may be adjustable such as by changing the height of the springs 1 with respect to the height of the springs 1'. The sand leaves the tubular body at its lower end through said outlet 5, the desorbed activated coke through outlet 6. Screen 7 ensures the separation of the sand from the activated coke. The $SO_2$-rich gas liberated by the desorption process exits through waste gas nozzle 8 and is discharged. A rigid supporting saddle 9 attached to material carrier 2 holds two unbalanced motors 10 and 10' whose unbalance disks 11 and 11' rotate in opposite directions as indicated by an arrow.

In a system of this design, the two unbalance disks 11 and 11' are subject to self-synchronization so that the sum of the two centrifugal forces yields a linear vibrating force which is perpendicular to the two motor centerlines in the plane of the centrifugal forces.

Supporting saddle 9 is attached to material carrier 2 so that the direction of the resulting vibration-generating force is located in a plane which is perpendicular to the centerline of the tubular body and inclined to the vertical plane. The force is applied to the center of gravity of the total system so that the latter is induced to perform translatory vibrations whose direction is the same as the direction of the resulting vibration-generating force. Under the influence of the vibration-generating forces, material components fed into the system are enduced to move in a manner which effects upward migration of the sand and activated coke particles on the inside surface of the tubular material carrier. Migrating particles of the bottom layer finally cause surface particles to slide back so that the material performs a continuous revolving motion in the direction of arrow. Moreover, thorough mixing of several material components is achieved by causing the forces to act directly on the individual material particles so that they perform a relative mixing motion in addition to the revolving motion because of friction and particle surface serration as well as different particle inertia. These phenomena combine to cause an ascension of the activated coke 13 across the specifically heavier sand 12 on the inclined surface of the mixture stream in the material carrier. This permits good degassing of the coke particles 13 which are moving freely for a short period.

The activated coke particles 14 which are sliding down along the material surface are drawn again into the sand at re-entry 15, heated and entrained into the near-circular route. The repeated mixing of the activated coke particles with the sand, their heating, degassing, segregation and re-heating result in a surprisingly short process route and desorption time for the spent activated coke.

The inclined position of the longitudinal centerline of the tubular body provides a helical revolving motion of the material towards sand outlet 5 and coke outlet 6, said motion ensuring a continuous throughput.

The invention is not limited to the device as described, but includes any device that permits achieving the flow configuration represented in FIG. 2 for mixing and segregation.

What is claimed is:

1. A process for the desorption of spent solid absorbent medium through heating the latter to desorption temperature, the improvement comprising the steps of:
   (a) introducing a spent absorbent medium and a hot carrier medium into an upper end of an inclined material carrier to form a mixture comprised of particles;
   (b) immediately tumbling the spent absorbent medium and the hot carrier medium mixture in a revolving path as the media are introduced into the upper end of the inclined material carrier; and
   (c) subjecting the mixture to periodic linear vibrational forces which act on the particles of the mixture as the mixture travels along the inclined material carrier for causing relative mixing of the particles as well as mixing of the particles in a revolving path as the mixture moves along the inclined material carrier.

* * * * *